United States Patent [19]

Yabe et al.

[11] Patent Number: 4,832,992

[45] Date of Patent: May 23, 1989

[54] PROCESS FOR THE PREPARATION OF INFORMATION RECORDING MEDIUM

[75] Inventors: Masao Yabe, Fujinomiya; Yoshio Inagaki, Isehara, both of Japan

[73] Assignee: Fuji Photo Film Co., Ltd., Kanagawa, Japan

[21] Appl. No.: 136,962

[22] Filed: Dec. 23, 1987

[30] Foreign Application Priority Data

Dec. 23, 1986 [JP] Japan ................... 61-307374
Feb. 4, 1987 [JP] Japan ................... 62-25001
Feb. 4, 1987 [JP] Japan ................... 62-25002
Feb. 4, 1987 [JP] Japan ................... 62-25003

[51] Int. Cl.$^4$ ................................. B05D 3/02
[52] U.S. Cl. ..................................... 427/384
[58] Field of Search ................... 427/53.1, 151, 384

*Primary Examiner*—Bernard Pianalto
*Attorney, Agent, or Firm*—Gerald J. Ferguson, Jr.

[57] ABSTRACT

A process for preparing an information recording medium in the form of an optical disc comprising a substrate and a recording layer. The recording layer is formed on the substrate by coating a dye solution which comprises a dye dissolved in a solvent of a fluorine-containing compound over the substrate, and drying thus coated layer.

9 Claims, No Drawings

PROCESS FOR THE PREPARATION OF INFORMATION RECORDING MEDIUM

BACKGROUND OF THE INVENTION

1. Field of the Invention

The present invention relates to a process for the preparation of an information recording medium for writing (i.e., recording) and/or reading out (i.e., reproducing) information by means of a laser beam having high energy density.

2. Description of Prior Art

Information recording media for recording and/or reproducing information by the use of a laser beam of high energy density have been developed in recent years and are put into practical use. Such recording media have been widely utilized in various fields, for example, as an optical disc such as a video disc and an audio disc as well as a disc memory for a large-capacity computer and a large-capacity static image file, a micro-image recording medium, an ultramicro-image recording medium, a micro-facsimile, and an optical card.

The conventional optical information recording medium basically comprises a transparent substrate of a plastic or glass material and a recording layer provided on the substrate. As materials of the recording layer, metals such as Bi, Sn, In and Te or semimetals, and dyes such as a cyanine dye, a metal complex compound and a quinone dye are generally known.

Writing (i.e., recording) of information on the recording medium can be conducted, for example, by irradiating the medium with a laser beam. Under irradiation with the laser beam, the irradiated area of the recording layer of the recording medium absorbs energy of the beam and rise of temperature locally occurs and, as a result, a chemical or physical change is caused to alter (or change) optical characteristics of the recording layer in the irradiated area, whereby the recording of information is made. Reading of the information from the recording medium is also conducted by irradiating the medium with a laser beam. The information can be reproduced by detecting reflected light or transmitted light corresponding to the change in the optical characteristics of the recording layer.

Recently, an optical disc having an air-sandwich structure for protecting the recording layer has been proposed. The optical disc of air-sandwich structure comprises two disc-shaped substrates, a recording layer provided on at least one of the substrates and two ring-shaped spacers (inner spacer and outer spacer), said two substrates interposing the recording layer being combined with each other in such a manner that a closed space is formed by the two substrates and the two spacers. In such recording medium, the recording layer is kept from direct exposure to an outer air, and recording or reproduction of information is carried out by applying a light of the laser beam to the recording layer through the substrate, whereby the recording layer is generally kept from physical or chemical damage. Further, the surface of the recording layer can be kept from deposition of dust which likely causes troubles in the recording and reproducing procedures.

An information recording medium using a dye as a recording material is excellent in various characteristics required for recording media such as high sensitivity, and additionally the medium has other advantageous features such that the recording layer can be easily formed on the substrate by a conventional coating method. In general, most of dyes including a cyanine dye are low in solubility, so that in the preparation of a coating solution using those dyes, solvents having high dissolving power (solvency) for those dyes such as halogenated hydrocarbons (e.g., dichloromethane and dichloroethane) are generally utilized.

However, a substrate made of a plastic material has poor resistance to those halogenated hydrocarbons, and the surface of the substrate is easily dissolved in the coating solution when the solution is coated over the substrate. As a result, there occur various troubles such that protruded and depressed portions for a tracking groove on the surface of the substrate are eliminated, or a portion of material of the substrate is migrated into the recording layer so as to lower the reflectance of the recording layer. For coping with such troubles, Japanese Patent Provisional Publication No. 59(1984)-217241 states that the plastic substrate is beforehand subjected to an insolubilizing treatment to reduce dissolution by the halogenated hydrocarbon solvent.

SUMMARY OF THE INVENTION

It is an object of the present invention to provide a process for the preparation of an information recording medium using a specific solvent.

It is another object of the invention to provide a process for the preparation of an information recording medium by which the recording layer is formed on the substrate by a generally employed coating method without dissolving the substrate.

It is a further object of the invention to provide a process for the preparation of an information recording medium by which the recording medium can be easily prepared.

There is provided by the invention a process for the preparation of an information recording medium comprising a substrate and a recording layer for writing and/or reading information by means of a laser beam which is provided on the substrate, wherein said recording layer is formed on the substrate by coating a dye solution which contains a dye dissolved in a solvent containing a fluorine-containing compound over the substrate to form a coated layer, and drying the coated layer.

According to the present invention, a fluorine-containing compound is used as a solvent for preparing a coating solution for the formation of a recording layer containing a dye as a recording material, whereby the coating solution can be easily prepared and the substrate can be prevented from being dissolved in the coating solution.

The fluorine-containing compound employed as a solvent in the invention has a high dissolving power (i.e., solvency) for a dye such as a cyanine dye, so that a coating solution for the formation of a recording layer can be easily prepared. Further, since the substrate made of a plastic material such as polycarbonate is insoluble in this compound, the substrate is not dissolved during the coating procedure.

Accordingly, the process of the invention can give an information recording medium improved in various properties without bringing about the aforementioned troubles such as disappearance of a groove on the surface of the substrate and lowering of reflectance of the recording layer. Moreover, it is unnecessary to subject the substrate to an insolubilizing treatment against the solvent, and hence the recording medium can be prepared by a simple process at a low manufacturing cost.

DETAILED DESCRIPTION OF THE INVENTION

An information recording medium can be prepared, for example, by the following process according to the present invention.

A material of the substrate employable in the invention can be selected from any materials which have been employed as the substrates of the conventional recording media. From the viewpoint of optical characteristics, smoothness, workability, handling properties, long-term stability and manufacturing cost, preferred examples of the substrate materials include acrylic resins such as cell-cast polymethyl methacrylate and injection-molded polymethyl methacrylate; vinyl chloride resins such as polyvinyl chloride and vinyl chloride copolymer; epoxy resins; polycarbonate resins; amorphous polyolefins; polyesters; glasses such as a tempered glass (e.g., soda-lime glass); and ceramics.

The process of the invention is most effectively applied to the case of using the plastic material as the substrate and, among the plastic materials, polycarbonate resin, polymethyl methacrylate, epoxy resins, amorphous polyolefins, polyesters and polyvinyl chloride are preferably used in the invention. From the viewpoint of dimensional stability, transparency and smoothness, preferred are polymethyl methacrylate, polycarbonate resins, epoxy resins, amorphous polyolefins, polyesters, and glasses. These materials can be employed as substrates in the form of a flexible film or in the form of a rigid plate.

The surface of the substrate on which a recording layer is to be coated may be provided with an undercoating layer for the purpose of improving smoothness and adhesion to the recording layer and preventing the recording layer from being denatured. Examples of materials for the undercoating layer include polymer materials such as polymethyl methacrylate, acrylic acid/methacrylic acid copolymer, styrene/maleic anhydride copolymer, polyvinyl alcohol, N-methylol acrylamide, styrene/sulfonic acid copolymer, styrene/vinyl toluene copolymer, chlorosulfonated polyethylene, nitrocellulose, polyvinyl chloride, chlorinated polyolefin, polyester, polyimide, vinyl acetate/vinyl chloride copolymer, polyethylene, polypropylene and polycarbonate; organic materials such as silane-coupling agents; and inorganic materials such as inorganic oxides (e.g., $SiO_2$, $Al_2O_3$), and inorganic fluorides (e.g., $MgF_2$).

In the case of a glass substrate, an undercoating layer made of a polymer having a hydrophilic group and/or a maleic anhydride group such as a styrene/maleic anhydride copolymer is preferably provided thereon for the purpose of preventing the recording layer from adverse effects caused by an alkali metal ion and an alkaline earth metal ion liberating from the substrate.

The undercoating layer can be formed, for example, by dissolving or dispersing the above-mentioned material in an appropriate solvent and coating the solution or dispersion on a substrate through a known coating method such as spin coating, dip coating, or extrusion coating. The thickness of the undercoating layer is generally in the range of 0.005 to 20 $\mu$m, preferably in the range of 0.01 to 10 $\mu$m.

On the substrate (or the undercoating layer) may be provided a pregroove layer for the purpose of forming a tracking groove or protruded and depressed portions which indicate information such as address signals. As a material for the pregroove layer, there can be employed a mixture of at least one monomer (or oligomer) selected from the group consisting of monoester, diester, triester and tetraester of an acrylic acid and a photopolymerization initiator.

The pregroove layer can be formed on the substrate (or the undercoating layer) by the process described below. In the first place, a mixture solution of the acrylic acid ester and the photopolymerization initiator is coated on a precisely prepared stamper, and on the coated layer of the solution is placed a substrate. Then the coated layer is cured under irradiation with ultraviolet rays via the stamper or the substrate so as to fix the substrate to the cotated liquid composition. Subsequently, the substrate is separated from the stamper. Thus, a substrate provided with a pregroove layer can be prepared. The thickness of the pregroove layer is generally in the range of 0.05 to 100 $\mu$m, preferably in the range of 0.1 to 50 $\mu$m. In the case of using a plastic substrate, a pregroove can be formed directly on the substrate by means of injection molding or extrusion molding.

The fluorine-containing compound employable as a solvent in the invention dissolves neither the plastic substrate nor the material of the pregroove layer, so that the aforementioned effects can be obtained not only in the case of providing the recording layer directly on the substrate but also in the case of providing the recording layer on the pregroove layer.

On the substrate (or the pregroove layer, etc.) is provided a recording layer.

The recording layer is a layer comprising substantially only a dye or a layer comprising a binder and a dye dispersed therein.

The dye employable in the present invention can be selected from those conventionally used as recording materials of information recording media. Examples of the dyes include a cyanine dye, a phthalocyanine dye, a pyrylium dye, a thiopyrylium dye, an azulenium dye, a squarillium dye, a metal complex salt dye such as Ni or Cr, a naphthoquinone dye, an anthraquinone dye, an indophenol dye, an indoaniline dye, a triphenylmethane dye, a triallylmethane dye, an aminium dye, a diimmonium dye and a nitroso compound.

Among those dyes, preferred are dyes having high absorption for a light in the wavelength region of near infrared rays such as 700 to 900 nm, because a semiconductor laser giving the near infrared rays is in practical use as a laser for recording and reproducing information.

Examples of such dyes having high absorption are as follows.

Cyanine dye:
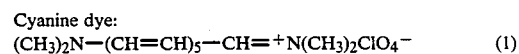
(1)

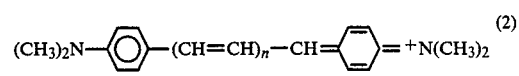
(2)

in which n is 2 or 3.

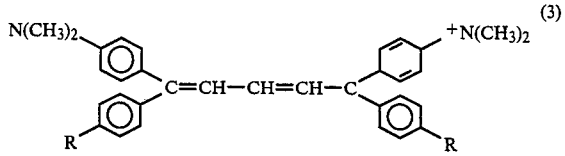

in which R is the hydrogen atom or N(CH₃)₂.

$$A-(CH=CH)_n-CH=B \tag{4}$$

in which

A is 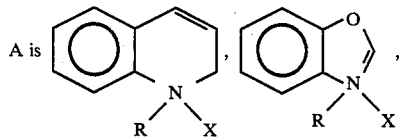

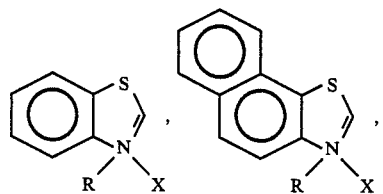

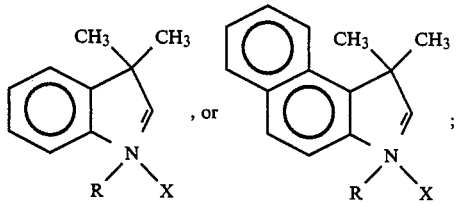

B is 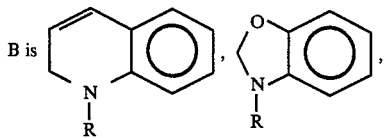

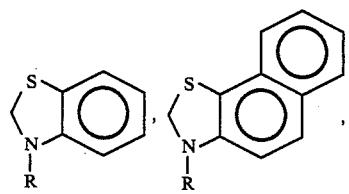

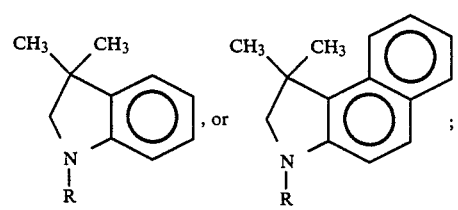

R is an alkyl group; X is a counter ion; chlorine atom, an alkyl group, an alkoxy group or an aryl group may exist in the benzene ring or the naphthalene ring; and n is an integer of 0 to 3.

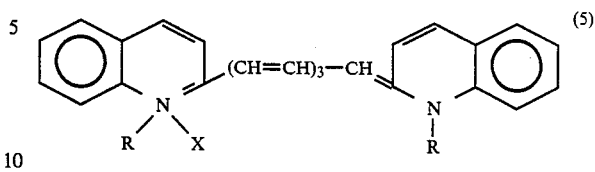

in which R is an alkyl group, and X is a halogen atom.

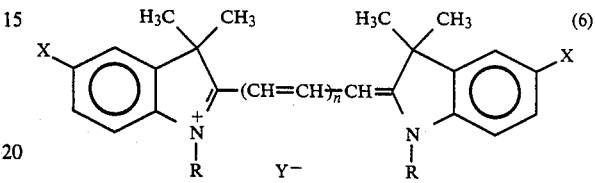

in which R is a group of a substituted or unsubstituted alkyl, alkoxy, aralkyl or alkenyl; X is hydrogen atom or a halogen atom; Y is halogen, perchlorate, or substituted or unsubstituted benzene sulfonate, paratoluene sulfonate, methyl sulfonate, ethyl sulfonate, benzene carboxylate, methyl carboxylate or trifluoromethyl carboxylate; and n is an integer of 0 to 3.

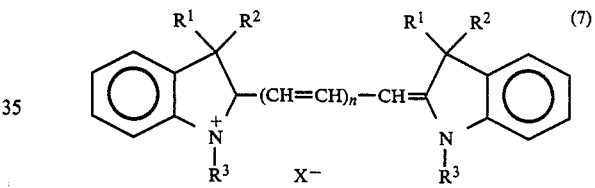

in which each of $R^1$, $R^2$ and $R^3$ is a substituted or unsubstituted alkyl group, and $R^1$, $R^2$ and $R^3$ are the same or different from each other; $X^-$ is a perhalogen acid ion, a toluenesulfuric acid ion or an alkylsulfuric acid ion; n is an integer of 0 to 3; a halogen atom exists on at least one of forth, fifth, sixth and seventh positions of the indolenine ring, and a halogen atom may exists on other unit of the indolenine ring; and the benzene ring may be substituted with an alkyl group, an alkoxy group, a hydroxy group, a carboxy group, an allyl group or an alkylcarbonyl group.

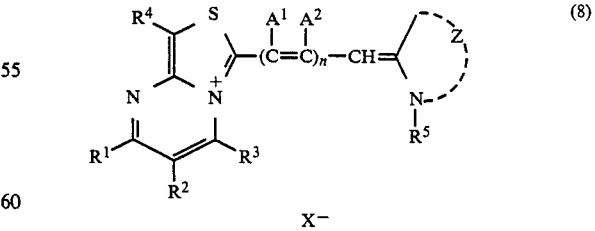

in which each of $A^1$ and $A^2$ is hydrogen atom or a substituted group; Z is an atom group required for forming a 5 membered heterocyclic ring; each of $R^1$ to $R^4$ is hydrogen atom or a substituted group; $R^5$ is a substituted group or may form a 6 membered heterocyclic ring; $X^-$ is an anion; and n is an integer of 0 to 2.

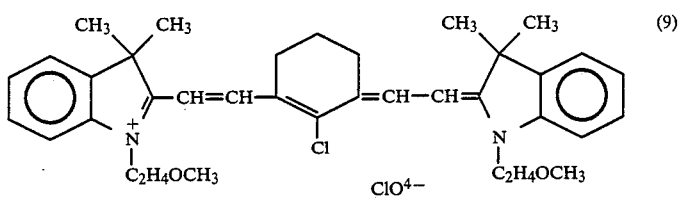

(9)

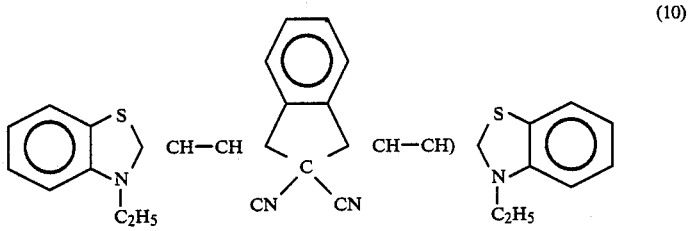

(10)

$$\Phi - L = \Psi \; (X^-)_m \qquad (11)$$

in which each of Φ and Ψ is a residual group of an indole ring, a thiazole ring, an oxazole ring, a selenazole ring, an imidazole ring or a pyridine ring which may be condensed with an aromatic ring; L is a connecting ring for forming monocarbocyanine, dicarbocyanine, tricarbocyanine or tetracarbocyanine; $X^-$ is an anion; and m is 0 or 1.

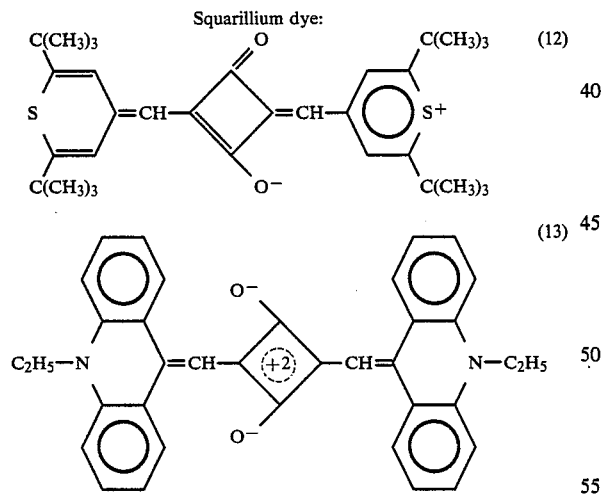

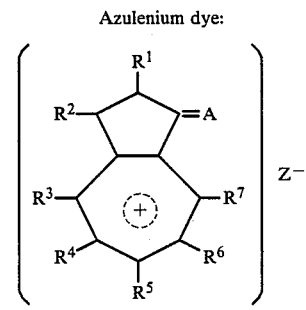

-continued in which at least one combination of $R^1$ and $R^2$, $R^2$ and $R^3$, $R^3$ and $R^4$, $R^4$ and $R^5$, $R^5$ and $R^6$, and $R^6$ and $R^7$ forms a substituted or unsubstituted heterocyclic ring or aliphatic ring, and each of $R^1$, $R^2$, $R^3$, $R^4$, $R^5$, $R^6$ and $R^6$ is hydrogen atom, a halogen atom or a monovalent organic residual group when they do not form said ring; at least one combination of $R^1$ and $R^2$, $R^2$ and $R^3$, $R^3$ and $R^4$, $R^4$ and $R^5$, $R^5$ and $R^6$, and $R^6$ and $R^7$ may form a substituted or unsubstituted aromatic group; A is a divalent organic residual group bonded through double bond; and $Z^-$ is an anionic residual group. Herein, at least one carbon atom constituting the azulene ring may be substituted with a nitrogen atom to form an azazulene ring.

Indophenol dye:

-continued

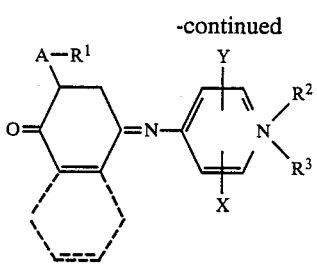 (15)

in which each of X and Y is hydrogen atom, an alkyl group, an acylamino group, an alkoxy group or a halogen atom; each of $R^1$, $R^2$ and $R^3$ is hydrogen atom, a substituted or unsubstituted alkyl group, aryl group, heterocyclic ring or cyclohexyl group having 1-20 carbon atoms; and A is —NHCO— or —CONH—.

Metal complex salt dye:

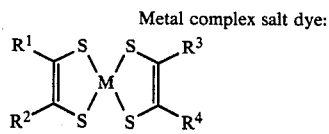 (16)

in which each of $R^1$ to $R^4$ is an alkyl group or an aryl group; and M is a divalent transition metal atom.

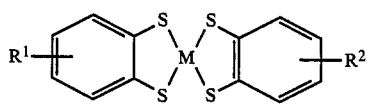 (17)

in which each of $R^1$ and $R^2$ is an alkyl group or a halogen atom; M is a divalent transition metal atom.

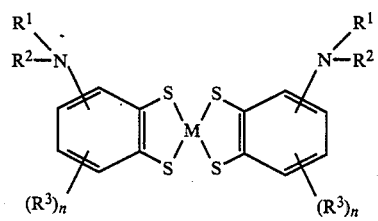 (18)

in which each of $R^1$ and $R^2$ is a substituted or unsubstituted alkyl or aryl group; $R^3$ is an alkyl group, a halogen atom or a group of

(wherein each of $R^4$ and $R^5$ is a substituted or unsubstituted alkyl or aryl group); M is a transition metal atom; and n is an integer of 0-3.

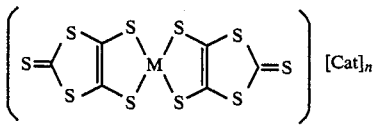 (19)

in which [Cat] is a cation required for formation of a neutralized complex salt; M is Ni, Cu, Co, Pd or Pt; and n is 1 or 2.

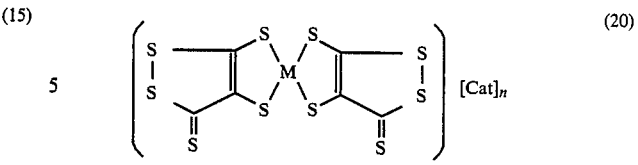 (20)

in which [Cat] is a cation required for formation of a neutralized complex salt; M is Ni, Cu, Co, Pd or Pt; and n is 1 or 2.

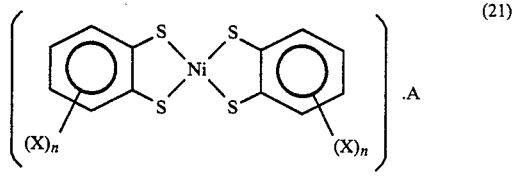 (21)

in which X is hydrogen atom, chlorine atom, bromine atom or methyl group; n is an integer of 1 to 4; and A is quaternary ammonium group.

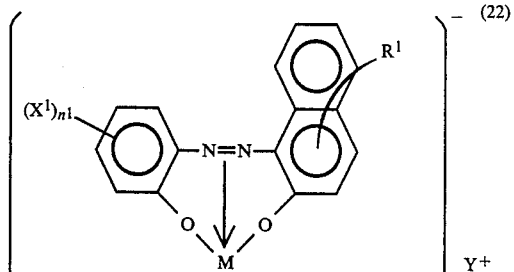 (22)

in which each of $X^1$ and $X^2$ is a nitro group and/or a halogen atom; each of $n_1$ and $n_2$ is an integer of 1 to 3; each of $R^1$ and $R^2$ is amino group, a monoalkylamino group, a dialkylamino group, acetylamino group, benzoylamino group (including a substituted benzoylamino group); $X^1$ and $X^2$ are the same or different from each other; $n_1$ and $n_2$ are the same or different from each other; $R^1$ and $R^2$ are the same or different from each other; M is Cr or Co; Y is hydrogen, sodium, potassium, ammonium (including substituted aliphatic ammonium) or aliphatic ammonium.

Naphthoquinone dye, Anthraquinone dye:

(23)

in which R is hydrogen atom, an alkyl group, an aryl group, amino group or a substituted amino group.

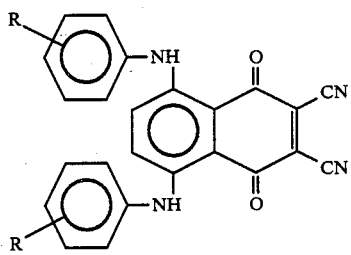
(24)

in which R is hydrogen atom, an alkyl group, an aryl group, amino group or a substituted amino group.

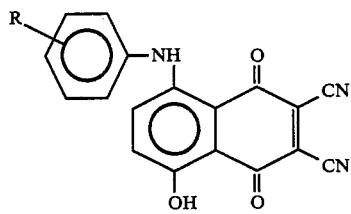
(25)

in which R is hydrogen atom, an alkyl group, an aryl group, amino group or a substituted amino group.

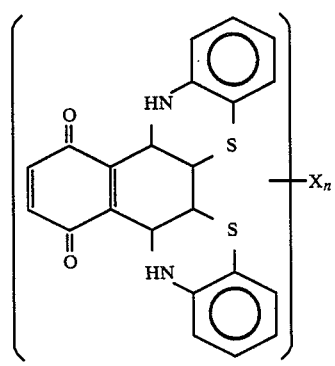
(26)

in which X is a halogen atom; and n is an integer of 0 to 10.

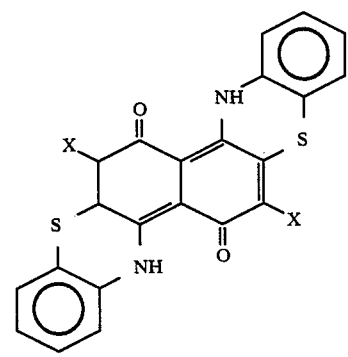
(27)

in which X is a halogen atom.

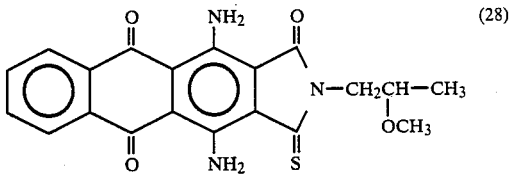
(28)

Among the above-mentioned dyes, cyanine dyes are most preferably used in the process of the present invention. The above-mentioned dyes can be employed independently or in combination. In the cae of using a cyanine dye, the above-described metal complex salt dye, aminium dye or diimmonium dye may be employed as a quencher in combination with the cyanine dye.

The formation of the recording layer can be done by dissolving the above-mentioned dye (as well as a binder, if desired) in a solvent to prepare a coating solution, then coating the solution over the surface of the substrate, and drying the coated layer.

As the solvent for preparing a coating solution, that is a characteristic requisite of the invention, a compound containing fluorine is employed. Examples of the fluorine-containing compounds employable in the invention include a fluorinated alcohol, a fluorine-substituted ketone, a fluorine-substituted ester, a fluorine-substituted hydrocarbon, a fluorinated carboxylic acid, a fluorine-substituted amide, and a fluorinated ether.

As the fluorinated alcohol, there can be mentioned, for example, a compound having the formula (I):

$$A-CH_2OH \quad (I)$$

in which A is $CF_3$ or $H(CF_2.CF_2)n$ wherein n is an integer of 1 to 3.

Concrete examples of the compounds having the formula (I) are as follows.

H—$CF_2$—$CF_2$—$CH_2OH$
H—$CF_2$—$CF_2$—$CF_2$—$CF_2$—$CH_2OH$
$CF_3$—$CH_2OH$

As the fluorine-substituted ketone, there can be mentioned, for example, a compound having the formula (II):

(II)

in which each of A and B is a substituted or unsubstituted alkyl or aryl group; and at least one of A and B has contains at least one fluorine atom.

Examples of the substituted groups of A or B in the above formula (II) include chlorine atom, bromine atom, nitro group, hydroxyl group, and a substituted or unsubstituted group of alkyl, aryl, phenyl, alkoxy, phenoxy, alkoxycarbonyl or phenoxycarbonyl. Each of A and B preferably is —$CF_3$, $CF_3$—$(CF_2CF_2)_h$—, H—$(CF_2CF_2)_i$—, H—$(CF_2CF_2)_j$—$CH_2$—, $CF_3COCH_2$— or —$C_6F_5$, wherein each of h, i and j is an integer of 1 to 3. The molecular weight of said compounds preferably is not more than 400.

Concrete examples of the compounds having the above formula (II) are as follows.

$CF_3COCF_3$
$CF_3COCH_2COCF_3$
$CF_3COCH_2COCH_3$
$HCF_2CF_2CH_2OCOOCH_2CF_2CF_2H$

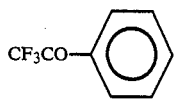

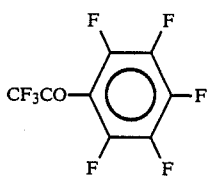

As the fluorine-substituted ester, there can be mentioned, for example, a compound having the formula (III):

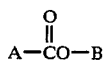  (III)

in which each of A and B is a substituted or unsubstituted alkyl or aryl group; and at least one of A and B has at least one fluorine atom.

Examples of the substituted groups of A or B in the above formula (III) include chlorine atom, bromine atom, nitro group, hydroxy group, a substituted or unsubstituted alkyl or phenyl group, and a substituted or unsubstituted group of amino, cyano, carboxyl, alkoxycarbonyl or phenoxycarbonyl. Each of A and B preferably is —CF$_3$, CF$_3$—(CF$_2$CF$_2$)$_h$—, H—(CF$_2$CF$_2$)$_i$— or H—(CF$_2$CF$_2$)$_j$—CH$_2$—, wherein each of h, i and j is an integer of 1 to 3. The molecular weight of said compounds preferably is not more than 400.

Concrete examples of the compounds having the above formula (III) are as follows.
CF$_3$COOCH$_3$
CF$_3$COOC$_2$H$_5$
CH$_3$COOCH$_2$CF$_3$
CF$_3$COOCH$_2$CF$_3$
CH$_3$COOCH$_2$CF$_2$CF$_2$H
CF$_3$CF$_2$CF$_2$COOC$_2$H$_5$
CF$_3$(CF$_2$)$_4$COOCH$_3$

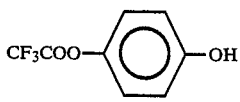

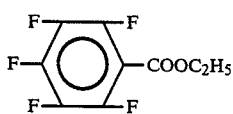

The fluorine-substituted hydrocarbon employable in the invention includes a fluorine-substituted aromatic hydrocarbon (i.e., fluorinated aryl) and a fluorine-substituted aliphatic hydrocarbon (i.e., fluorinated alkane).

As the fluorine-substituted aromatic hydrocarbon (fluorinated aryl), there can be mentioned fluorine-substituted benzene having the formula (IV):

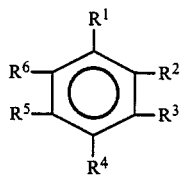

in which R$^1$ is a fluorine atom, and each of R$^2$ to R$^6$ is hydrogen atom, fluorine atom, chlorine atom, bromine atom or an alkyl group.

In the above formula (IV), each of R$^2$ to R$^6$ preferably is hydrogen atom, fluorine atom or chlorine atom. The molecular weight of the compound preferably is not more than 400.

Concrete examples of the compounds having the above formula (IV) are as follows.

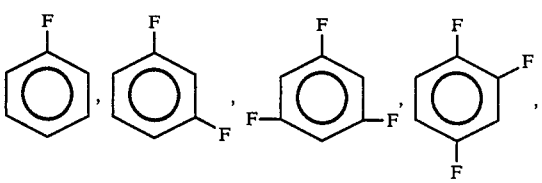

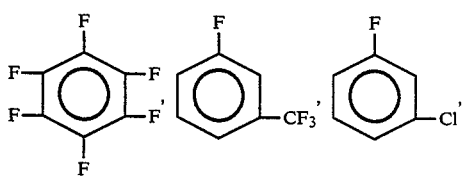

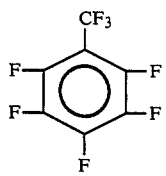

As the fluorine-substituted aliphatic hydrocarbon (fluorinated alkane), there can be mentioned a compound having 1–20 carbons in which at least one hydrogen atom is substituted by fluorine atom. The compound may take any form of straight chain, ring and branch. In these compounds, a hydrogen atom may be further substituted with chlorine atom, bromine atom, or a substituted or unsubstituted alkylsulfonyl or alkylsulfinyl group in addition to fluorine atom. Most preferred is chlorine atom. The molecular weight of the compound preferably is not more than 400.

Concrete examples of the fluorinated alkanes are as follows.
CCl$_2$F$_2$
CCl$_3$F
ClF$_2$C—CClF$_2$
F$_2$CHCH$_3$
CF$_3$(CF$_2$)$_4$CF$_3$

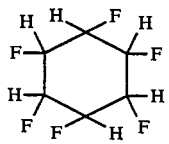

As the fluorinated carboxylic acid, there can be mentioned a compound having the formula (V):

$$CF_3(CF_2)_nCOOH \quad (V)$$

in which n is an integer of 2 to 4.

As the fluorinated amide, there can be mentioned a compound having the formula (VI):

$$CF_3(CF_2)_nCONH_2 \quad (VI)$$

in which n is an integer of 2 to 4.

The above-described fluorine-containing compounds are given by no means restrict the compounds employable in the invention, and any other compound can be also employed provided that the compound is an organic compound containing at least one fluorine atom in one molecule and serves as a solvent for dyes.

In the present invention, the above-mentioned fluorine-containing compounds can be employed independently or in combination with ore or more other solvents.

Examples of the solvents employable in combination with the fluorine-containing compound for the preparation of the coating solution include solvents capable of dissolving the dye such as toluene, xylene, ethyl acetate, butyl acetate, cellosolve acetate, methyl ethyl ketone, dichloromethane, 1,2-dichloroethane, chloroform, dimethylformamide, methyl isobutyl ketone, cyclohexanone, cyclohexane, tetrahydrofuran, ethyl ether, dioxane, ethanol, n-propanol, isopropanol, and n-butanol. The coating solution for the formation of the recording layer may further contain other additives such as an antioxidant, a UV-absorbent, a plasticizer and a lubricant according to the purpose.

In the case of using a binder for the formation of the recording layer, examples of the binders include natural organic polymer materials such as gelatin, cellulose derivative, dextran, rosin and rubber; and synthetic organic polymer materials such as hydrocarbon resins (e.g., polyethylene, polypropylene, polystyrene and polyisobutylene), vinyl resins (e.g., polyvinyl chloride, polyvinylidene chloride and vinyl chloride/vinyl acetate copolymer), acrylic resins (e.g., polymethyl acrylate and polymethyl methacrylate), and precondensates of thermosetting resins (e.g., polyvinyl alcohol, chlorinated polyethylene, epoxy resin, butyral resin, rubber derivative and phenol formaldehyde resin).

The coating procedure can be carried out by a conventional method such as spray coating, spin coating, dip coating, roll coating, blade coating, doctor roll coating and screen printing.

When the binder is used for the formation of the recording layer, the ratio of the dye to the binder is generally in the range of 0.01 to 99 wt.%, preferably 1.0 to 95 wt.%. In the case of using a mixed solvent of the fluorine-containing solvent and other solvent, the ratio of the fluorine-containing solvent to the whole solvent varies depending on the combination and kinds of the dye or the substrate. Generally, the ratio of the fluorine-containing solvent to the whole solvent is in the range of 5 to 95 wt.%, preferably 30 to 90 wt.%. The resulting coating solution generally has a dye concentration ranging from 0.01 to 10 wt.%, preferably 0.1 to 5 wt.%.

The recording layer may be in the form of a single layer or plural layers, and in any case, the thickness of the recording layer is generally in the range of 0.01 to 10 μm, preferably in the range of 0.02 to 1 μm. The recording layer may be provided on only one surface of the substrate or both surfaces of the substrate.

On the recording layer may be provided a reflecting layer for the purpose of increasing the S/N ratio in the reproduction procedure of information or improving a sensitivity in the recording (writing) procedure.

The reflecting layer is essentially composed of a light-reflecting material. The light-reflecting material has a high reflectance for the laser beam. Examples of the light-reflecting materials include metals and semi-metals such as Mg, Se, Y, Ti, Zr, Hf, V, Nb, Ta, Cr, Mo, W, Mn, Be, Fe, Co, Ni, Ru, Rh, Pd, Ir, Pt, Cu, Ag, Au, Zn, Cd, Al, Ga, In, Si, Ge, Te, Pb, Po, Sn and Bi. Preferred are Al, Cr and Ni. These materials can be used alone or in combination. Alloys thereof can be also employed in the invention.

The reflecting layer can be formed on the recording layer using the light-reflecting material according to a known method such as deposition, sputtering or ion plating. The thickness of the reflecting layer is generally in the range of 100 to 3,000 angstroms.

The reflecting layer may be provided between the substrate and the recording layer, and in this case, the recording and reproduction of information is carried out from the recording layer side, namely the opposite side of the substrate side.

A protective layer may be further provided on the recording layer (or the reflecting layer) to physically or chemically protect the recording layer. The protective layer can be also provided on the surface of the substrate where the recording layer is not provided to enhance a resistance to damage or humidity. As a material of the protective layer, there can be mentioned inorganic materials such as SiO, $SiO_2$, $MgF_2$ and $SnO_2$; and organic materials such as thermoplastic resins, thermosetting resins and UV-curable resins.

The protective layer can be formed on the recording layer (or the reflecting layer) and/or the substrate by laminating a plastic film having been prepared by extrusion processing over any of those layers and/or the substrate by way of an adhesive layer. Otherwise, a method of vacuum deposition, sputtering or coating can be also applied to form the protective layer. In the case of using the thermoplastic resin or the thermosetting resin, the resin is dissolved in an appropriate solvent to prepare a coating solution, and the solution is coated over the recording layer and/or the substrate. The coated layer is then dried to form a protective layer. In the case of using the UV-curable resin, a solution of the resin in an appropriate solvent is coated over the recording layer and/or the substrate, and the coated layer of the solution is irradiated with ultraviolet rays to cure the layer so as to form a protective layer. In any case, the coating solution may further contain a variety of additives such as an antistatic agent, an antioxidant and a UV-absorbent according to the purpose. The thickness of the protective layer is generally in the range of 0.1 to 100 μm.

The structure of the information recording medium prepared by the process of the present invention is by no means limited to the above-mentioned structure, and other structures can be also prepared according to the invention. For example, there can prepared by the process of the invention an information recording medium in which two substrates having the above-mentioned constitution and interposing the recording layer are combined using an adhesive, or an information recording medium of air-sandwich structure in which two disc-shaped substrates, at least one of those substrates having the above-mentioned constitution, are combined with each other by way of a ring-shaped outer spacer and a ring-shaped inner spacer so as to form a closed space surrounded by the two substrates and the two spacers.

Examples for the present invention are given below, but these examples by no means restrict the invention.

EXAMPLE 1

2 g. of a cyanine dye having the following formula was dissolved in 100 cc of 2,2,3,3-tetrafluoropropyl alcohol ($HCF_2CF_2CH_2OH$) to prepare a coating solution having a concentration of 2 wt.%.

Cyanine dye

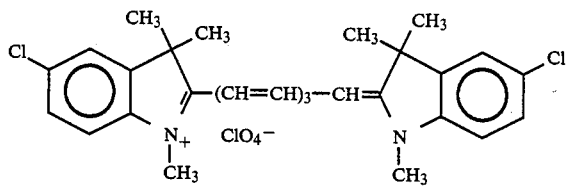

The obtained solution was coated over a disc-shaped polycarbonate substrate having been provided with a tracking guide (outer diameter: 130 mm, inner diameter: 15 mm, thickness: 1.2 mm, track pitch: 1.6 μm, depth of groove: 800 angstroms) by means of spin coating at 2,000 rpm to give a coated layer of the solution, and the coated layer was dried at 70° C. for 10 minutes to form a recording layer having dry thickness of 0.06 μm on the substrate.

Thus, an information recording medium consisting essentially of a substrate and a recording layer was prepared.

COMPARISON EXAMPLE 1

The procedure of Example 1 was repeated except for using dichloroethane as a solvent in the preparation of a coating solution, to prepare an information recording medium consisting essentially of a substrate and a recording layer.

The information recording media obtained in Example 1 and Comparison Example 1 were examined on the recording and reproducing properties. The examination thereof was able to be done along the groove on the surface of the substrate with respect to the recording medium prepared by the process of the invention (Example 1), but the examination thereof was unable to be done with respect to the recording medium prepared by the conventional process (Comparison Example 1) because the surface of the substrate was dissolved and the groove disappeared.

EXAMPLE 2

The procedure of Example 1 was repeated except for further adding a nickel complex salt dye having the following formula as a quencher in the same mol as that of the cyanine dye in the preparation of a coating solution, to prepare an information recording medium consisting essentially of a substrate and a recording layer.

Nickel complex salt dye:

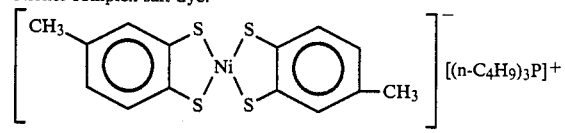

EXAMPLE 3

The procedure of Example 1 was repeated except for further adding a diimmonium dye having the following formula as a quencher in the same mol as that of the cyanine dye in the preparation of a coating solution, to prepare an information recording medium consisting essentially of a substrate and a recording layer.

Diimmonium dye:

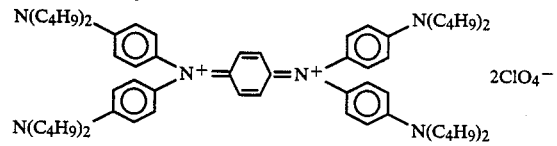

EXAMPLE 4

The procedure of Example 1 was repeated except for using a cyanine dye having the following formula in the preparation of a coating solution, to prepare an information recording medium consisting essentially of a substrate and a recording layer.

Cyanine dye

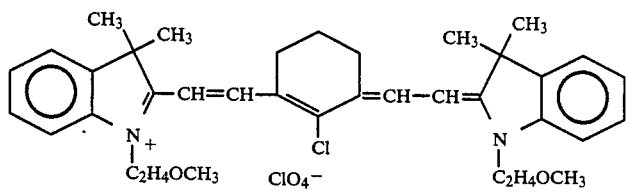

EXAMPLE 5

The procedure of Example 1 was repeated except for using a cyanine dye having the following formula in the preparation of a coating solution, to prepare an information recording medium consisting essentially of a substrate and a recording layer.

Cyanine dye:

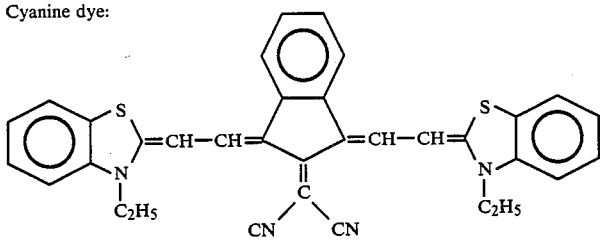

EXAMPLE 6

The procedure of Example 1 was repeated except for using a squarillium dye having the following formula in the preparation of a coating solution, to prepare an information recording medium consisting essentially of a substrate and a recording layer.

Squarillum dye:

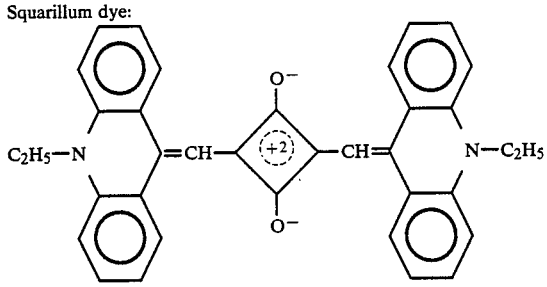

The information recording media obtained in Examples 2 to 6 were examined on the recording and reproducing properties. With respect to each medium prepared by the process of the invention using a fluorinated alcohol, any groove on the surface of the substrate was not eliminated but still remained, and the recording and reproducing properties were able to be examined along the groove.

EXAMPLE 7

The procedure of Example 1 was repeated except for using hexafluoroacetone ($CF_3COCF_3$) as a solvent instead of 2,2,3,3-tetrafluoropropyl alcohol in the preparation of a coating solution, to prepare an information recording medium consisting essentially of a substrate and a recording layer.

EXAMPLE 8

The procedure of Example 1 was repeated except for using hexafluoroacetylacetone ($CF_3COCH_2COCF_3$) as a solvent instead of 2,2,3,3-tetrafluoropropyl alcohol in the preparation of a coating solution, to prepare an information recording medium consisting essentially of a substrate and a recording layer.

EXAMPLE 9

The procedure of Example 1 was repeated except for using pentafluoroacetophenone having the following formula as a solvent instead of 2,2,3,3-tetrafluoropropyl alcohol in the preparation of a coating solution, to prepare an information recording medium consisting essentially of a substrate and a recording layer.

Pentafluoroacetophenone:

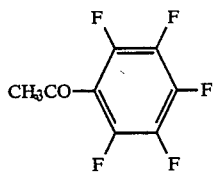

EXAMPLES 10-12

Each procedure of Examples 7 to 9 was repeated except for further adding the same nickel complex salt dye as that used in Example 2 in the same mol as a quencher in the preparation of a coating solution, to prepare information recording media consisting essentially of a substrate and a recording layer.

EXAMPLES 13-15

Each procedure of Examples 7 to 9 was repeated except for further adding the same diimmonium dye as that used in Example 3 in the same mol as a quencher in the preparation of a coating solution, to prepare information recording media consisting essentially of a substrate and a recording layer.

EXAMPLES 16-18

Each procedure of Examples 7 to 9 was repeated except for using the same cyanine dye as that used in Example 4 in the preparation of a coating solution, to prepare information recording media consisting essentially of a substrate and a recording layer.

EXAMPLES 19-21

Each procedure of Examples 7 to 9 was repeated except for using the same cyanine dye as that used in Example 5 in the preparation of a coating solution, to prepare information recording media consisting essentially of a substrate and a recording layer.

EXAMPLES 22-24

Each procedure of Examples 7 to 9 was repeated except for using the same squarillium dye as that used in Example 6 in the preparation of a coating solution, to prepare information recording media consisting essentially of a substrate and a recording layer.

The information recording media obtained in Examples 7 to 24 were examined on the recording and reproducing properties. With respect to each medium prepared by the process of the invention using a fluorine-substituted ketone, any groove on the surface of the substrate did not disappear but still remained, and the recording and reproducing properties were able to be examined along the groove.

EXAMPLE 25

The procedure of Example 1 was repeated except for using ethyl trifluoroacetate ($CF_3COOC_2H_5$) as a solvent instead of 2,2,3,3-tetrafluoropropyl alcohol in the preparation of a coating solution, to prepare an information recording medium consisting essentially of a substrate and a recording layer.

EXAMPLE 26

The procedure of Example 25 was repeated except for further adding the same nickel complex salt dye as that used in Example 2 in the same mol as a quencher in the preparation of a coating solution, to prepare an information recording medium consisting essentially of a substrate and a recording layer.

EXAMPLE 27

The procedure of Example 25 was repeated except for further adding the same diimmonium dye as that used in Example 3 in the same mol as a quencher in the preparation of a coating solution, to prepare an information recording medium consisting essentially of a substrate and a recording layer.

EXAMPLE 28

The procedure of Example 25 was repeated except for using the same cyanine dye as that used in Example 4 in the preparation of a coating solution, to prepare an information recording medium consisting essentially of a substrate and a recording layer.

EXAMPLE 29

The procedure of Example 25 was repeated except for using the same cyanine dye as that used in Example 5 in the preparation of a coating solution, to prepare an information recording medium consisting essentially of a substrate and a recording layer.

EXAMPLE 30

The procedure of Example 25 was repeated except for using the same squarillium dye as that used in Example 6 in the preparation of a coating solution, to prepare an information recording medium consisting essentially of a substrate and a recording layer.

The information recording media obtained in Examples 25 to 30 were examined on the recording and reproducing properties. With respect to each medium prepared by the process of the invention using a fluorine-substituted ester, any groove on the surface of the substrate did not disappear but still remained, and the recording and reproducing properties were able to be examined along the groove.

EXAMPLE 31

The procedure of Example 1 was repeated except for using hexafluorobenzene having the following formula as a solvent instead of 2,2,3,3-tetrafluoropropyl alcohol in the preparation of a coating solution, to prepare an information recording medium consisting essentially of a substrate and a recording layer.

Hexafluorobenzene:

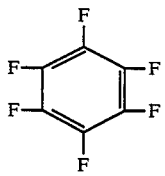

EXAMPLE 32

The procedure of Example 1 was repeated except for using perfluorotoluene having the following formula as a solvent instead of 2,2,3,3-tetrafluoropropyl alcohol in the preparation of a coating solution, to prepare an information recording medium consisting essentially of a substrate and a recording layer.

Perfluorotoluene:

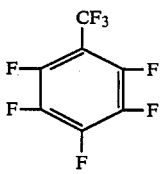

EXAMPLE 33

The procedure of Example 1 was repeated except for using perfluorohexane ($CF_3(CH_2)_4CF_3$) as a solvent instead of 2,2,3,3-tetrafluoropropyl alcohol in the preparation of a coating solution, to prepare an information recording medium consisting essentially of a substrate and a recording layer.

EXAMPLES 34–36

Each procedure of Examples 31 to 33 was repeated except for further adding the same nickel complex salt dye as that used in Example 2 in the same mol as a quencher in the preparation of a coating solution, to prepare information recording media consisting essentially of a substrate and a recording layer.

EXAMPLES 37–39

Each procedure of Examples 31 to 33 was repeated except for further adding the same diimmonium dye as that used in Example 3 in the same mol as a quencher in the preparation of a coating solution, to prepare information recording media consisting essentially of a substrate and a recording layer.

EXAMPLES 40–42

Each procedure of Examples 31 to 33 was repeated except for using the same cyanine dye as that used in Example 4 in the preparation of a coating solution, to prepare information recording media consisting essentially of a substrate and a recording layer.

EXAMPLES 43–45

Each procedure of Examples 31 to 33 was repeated except for using the same cyanine dye as that used in Example 5 in the preparation of a coating solution, to prepare information recording media consisting essentially of a substrate and a recording layer.

EXAMPLES 46–48

Each procedure of Examples 31 to 33 was repeated except for using the same squarillium dye as that used in Example 6 in the preparation of a coating solution, to prepare information recording media consisting essentially of a substrate and a recording layer.

The information recording media obtained in Examples 31 to 48 were examined on the recording and reproducing properties. With respect to each medium prepared by the process of the invention using a fluorine-substituted hydrocarbon, any groove on the surface of the substrate did not disappear but still remained, and the recording and reproducing properties were able to be examined along the groove.

We claim:

1. A process for the preparation of an information recording medium which comprises the steps of:
   coating a dye in a solvent containing at least 5 wt.% of a fluorine-containing compound selected from the group consisting of a fluorinated alcohol, a fluorine-substituted ketone, a fluorine-substituted ester, fluorine-substituted benzene, a fluorine-substituted amide, a fluorinated ether and a fluorine-substitute carboxylic acid over a substrate of a polymer selected from the group consisting of polycarbonate, polymethyl methyacrylate, an epoxy resin, amorphous polyolefin, polyester and polyvinyl chloride to form a coated layer; and
   drying the coated layer to form a recording layer for writing or reading information by means of a laser beam.

2. The process as claimed in claim 1, wherein said substrate is made of polycarbonate.

3. The process as claimed in claim 1 wherein said fluorine-containing compound is a fluorinated alcohol having the formula (I):

A—CH$_2$OH  (I)

in which A is CF$_3$ or H(CF$_2$.CF$_2$)$_n$ wherein n is an integer of 1 to 3.

4. The process as claimed in claim 1, wherein said fluorine-containing compound is a fluorine-substituted ketone having the formula (II):

(II)

in which each of A and B is a substituted or unsubstituted alkyl or aryl group, and at least one of A and B contains at least one fluorine atom.

5. The process as claimed in claim 1, wherein said fluorine-containing compound is a fluorine-substituted ester having the formula (III):

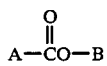
(III)

in which each of A and B is a substituted or unsubstituted alkyl or aryl group, and at least one of A and B contains at least one fluorine atom.

6. The process as claimed in claim 1, wherein said fluorine-containing compound is a fluorine-substituted benzene having the formula (IV):

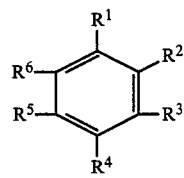
(IV)

in which R$^1$ is a fluorine atom, and each of R$^2$ to R$^6$ is hydrogen, chlorine, bromine or an alkyl group.

7. The process as claimed in claim 1, wherein said dye is a cyanine dye or a mixture of a cyanine dye and other dye.

8. The process as claimed in claim 1, wherein said solvent consists essentially of a fluorine-containing compound.

9. The process as claimed in claim 1, wherein said dye is at least one dye selected from the group consisting of a cyanine dye, a phthalocyanine dye, a pyrylium dye, a thiopyrylium dye, a squarillium dye, an azulenium dye, an indophenol dye, an indoaniline dye, a triphenylmethane dye, a quinone dye, an aminium dye, a diimmonium dye and a metal complex salt dye.

* * * * *

Disclaimer 4,832,992—Masao Yabe, Fujinomiya; Yoshio Inagaki, Isehara, both of Japan. PROCESS FOR THE PREPARATION OF INFORMATION RECORDING MEDIUM. Patent dated May 23, 1989. Disclaimer filed November 13, 2001, by assignee, Fuji Photo Film Co., Ltd.

The term of this patent shall not extend beyond the expiration date of Pat. No. 4,832,992.
*(Official Gazette, May 7, 2002)*